Figure 1:
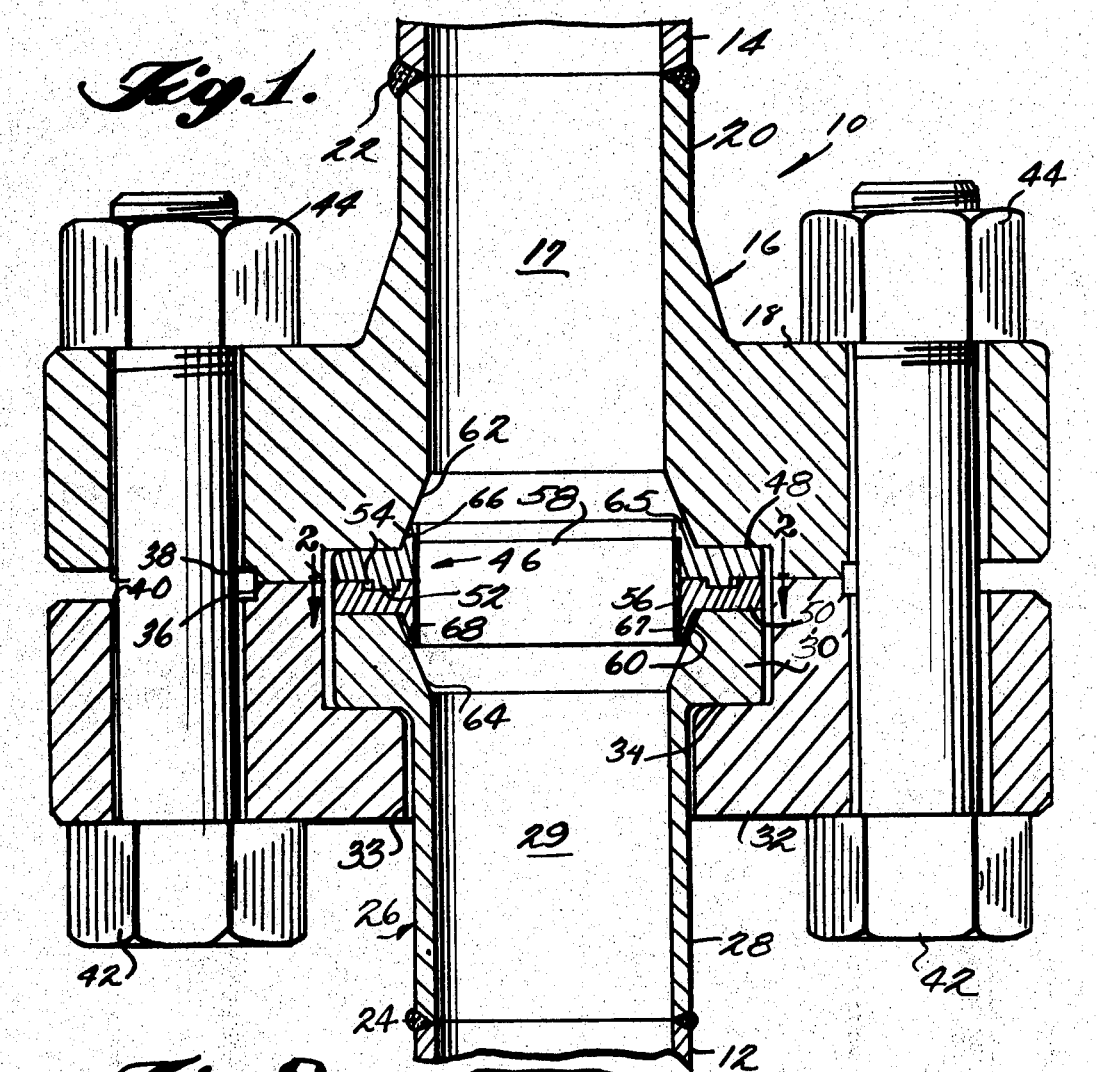

Jan. 31, 1967  R. E. LATHAM  3,301,577

TRANSITION JOINT

Filed Jan. 17, 1964

INVENTOR.
RAYMOND E. LATHAM
BY
Cushman, Darby & Cushman
ATTORNEYS

United States Patent Office 3,301,577
Patented Jan. 31, 1967

3,301,577
TRANSITION JOINT
Raymond E. Latham, Houston, Tex., assignor to Gray
Tool Company, Houston, Tex., a corporation of Texas
Filed Jan. 17, 1964, Ser. No. 338,490
4 Claims. (Cl. 285—187)

This invention relates to the sealing of connections between dissimilar materials and in particular to a sealing ring for use between a conduit-like member and another member of dissimilar thermal expansion characteristics.

The problem of effecting a leak-proof connection between two conduits or between a conduit and another structure such as a valve member or closure member is well recognized in applications where the two parts have dissimilar thermal expansion characteristics. In instances where extreme temperature differentials are encountered, such as in nuclear power reactors and in cryogenic work, the problem is a serious one, particularly when corrosive and radioactive materials are employed. In installations of this kind it is conventional to form certain conduits from zirconium or its alloys, columbium or its alloys and aluminum or its alloys. At the same time, it is often desirable to form other sections of the same conduit from material such as carbon steel or stainless steel. For example, cryogenic storage systems for liquid helium, oxygen and nitrogen often employ an aluminum storage vessel and 300 series stainless steel piping connected thereto. On the other hand some nuclear reactors employ zircoloy-2 fuel tubes which are joined to carbon steel piping systems. At the present time there is no known successful procedure for welding together these dissimilar metals in a manner to preclude leakage. Accordingly, when a conduit is provided which consists of different sections formed from such materials, a transition joint must be provided which compensates for the different expansion characteristics of the sections. While a number of mechanical arrangements are available for effecting joints between dissimilar metals none of them has been found to be completely satisfactory in the systems just referred to because the wide difference in thermal expansion properties of the metals eventually causes leakage with repeated temperature changes.

The present invention provides a transition joint which employs a bi-metallic split sealing ring which is clamped between the two conduit sections or other members being joined when the latter are drawn together by bolts or the like. The ring comprises two separate complete sub-rings in abutting relationship and an inner sleeve which prevents leakage between the two sub-rings. The sub-rings are constructed of different materials, each sub-ring being of the same material as the conduit section which it abuts. Preferably, the ring is shaped according to the principles set forth in Patent 2,766,829, issued October 16, 1956, so as to engage the conduit sections along tapered surfaces which form a seal which resists leakage of high pressure fluids.

It is, therefore, the primary object of the present invention to provide a transition joint adapted for use in coupling a conduit-like member to another member having different thermal expansion characteristics, which transition joint includes a novel split ring arrangement between the parts of the joint so as to effect a tight fluid seal regardless of operating temperatures.

It is a further object to provide a split sealing ring for use in effecting a fluid tight seal between parts having different thermal expansion characteristics, which ring is constructed of two separate abutting sub-rings and an inner sleeve connected to one of them and engaging the other for preventing leakage therebetween while permitting the sub-rings to expand or contract during temperature changes.

Figure 2:
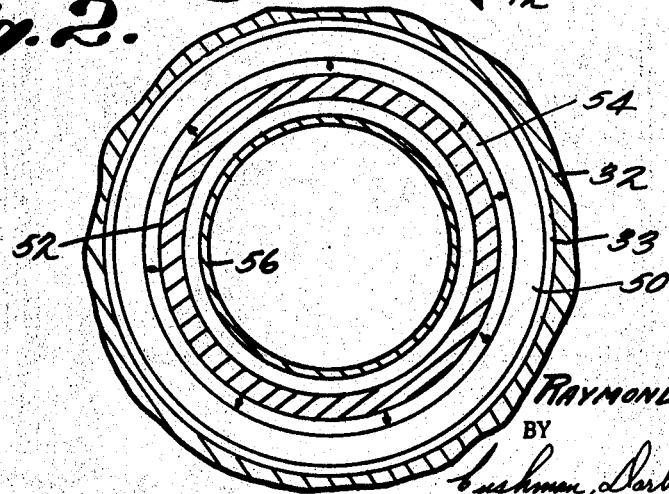

The invention will be further understood from the following detailed description in conjunction with the drawing in which:

FIGURE 1 is a longitudinal sectional view of a coupling embodying the principles of the invention, and FIGURE 2 is a transverse sectional view of the coupling taken on the line 2—2 of FIGURE 1.

Referring to the drawing there is shown, in its tightened state, a coupling 10 which connects a columbium tube 12 with a stainless steel tube 14. An arrangement of this kind might be found in a nuclear power reactor in which liquid reactor fuel is conveyed from the reactor core through the columbium tube 12 to the stainless steel tube 14 in a cooling system or some other auxiliary system.

As shown, the coupling 10 includes a stainless steel flange member 16 having a central bore 17, an integral exterior flange 18 and a short tubular portion 20 which is welded at 22 in abutting end-to-end relationship with the stainless steel tube 14. The end of the columbium tube 12 has welded thereto at 24 a special columbium fitting 26 which includes a tubular portion 28 having a bore 29 and an external flange 30 of relatively small diameter. Loosely surrounding the flange 30 and a part of the tubular portion 28 is a slip-on stainless steel flange 32 having a bore 33 defining an annular, axially facing shoulder 34 which engages the flange 30 of the columbium fitting 26. The slip-on flange 32 is of the same outside diameter as the other stainless steel flange 18 and is engageable therewith along the surface of an annular, axially projecting rib 36 which abuts a similar rib 38 on the flange 16. A plurality of circumferentially spaced bolt holes 40 pass through the flanges 16 and 26 in an axial direction and are provided with bolts 42 and nuts 44 for drawing the flanges 18 and 32 toward each other.

According to the principles of the invention the coupling 10 is provided interiorly with a split sealing ring assembly 46 which is clamped between the stainless steel flange 18 and the flange portion 30 of the tubular columbium fitting 26. The sealing ring assembly 46 includes two circular, coextensive sub-rings 48 and 50 each of which is formed of the same metal as the flange which it abuts. Thus, in the embodiment illustrated the upper sub-ring 48 is formed of stainless steel and the lower sub-ring 50 is formed of columbium. The stainless steel sub-ring 48 has a downwardly extending annular rib 52 which projects into and engages the lower surface of an expansion groove 54 in the sub-ring 50, the groove being of greater width than the rib 52.

A thin cylindrical stainless steel sleeve 56 having an internal diameter equal to the diameters of bores 17 and 29 is disposed within the bores of the two sub-rings 48 and 50. The upper end of the sleeve 56 is sealed to the bore of the stainless steel sub-ring 48 as by a weld 58 which extends around the entire circumference of the sleeve 56 at a location below the upper end of the bore. As shown, the sleeve 56 is also set into a slight counterbore in the stainless steel sub-ring 48 so that the sleeve 56 is flush with the portion of the bore of the sub-ring 48 above the weld 58. The periphery of the lower portion of the sleeve 56 engages, but is not secured to, the bore of the columbium sub-ring 50. The lower end of the sleeve 56 is bent laterally outwardly and then upwardly so as to form a frustro-conical portion 60 which faces generally downwardly. In the tightened coupling, as shown, this frustro-conical surface 60 is clamped between a portion of the columbium sub-ring 50 and a portion of the bore of the columbium fitting 26.

While the sealing ring assembly 46 has been described in terms of specific materials of construction, it will be understood that the selection of the materials depends on the nature of the conduits or other structures being coupled together. That is, in order to compensate for different thermal expansion characteristics of the conduits, each of the sub-rings 48 and 50 should be constructed of the same material as the conduit (or fitting) which it engages. Thus, in the embodiment illustrated the upper sub-ring 48 is formed of stainless steel because the flange 16 and the tube 14 are of stainless steel, and the lower sub-ring 50 is formed of columbium because the flanged fitting 26 and the tube 12 are of columbium.

It will be understood that the stainless steel flange 16 and the columbium fitting 26 are, in effect, merely extensions of the tubes 14 and 12, respectively. That is, these parts 16 and 26 are merely for the purpose of presenting sealing surfaces to the sealing ring assembly 46 and providing structure which permits the parts to be drawn together by a clamping arrangement such as the bolts 42. The flange 16 and the fitting 26 are, therefore, constructed of the same material as the tubes 14 and 12 to which they are welded so as to avoid thermal expansion problems and to locate the problems at the sealing ring assembly 46 which is designed to cope with them.

The material of construction for the sleeve 56 is determined by the material of the sub-ring to which it is attached so as to avoid thermal expansion problems at the point of attachment. Thus, in the illustrated embodiment the sleeve 56 is stainless steel because the tube 14, the flange 16 and the upper sub-ring 48 are of stainless steel.

As an additional feature for effecting a tight seal within the coupling 10, the sub-rings 48 and 50 are designed according to the principles set forth in the above-mentioned Patent 2,766,829. As fully described in that patent, a very effective sealing ring for use between conduit parts is achieved by constructing the ring with a body portion which is clamped between the conduit parts and upwardly and downwardly tapered inner lips which wedge against tapered sealing surfaces adjacent and inwardly of the ends of the conduit parts. Referring to the present drawing it will be seen that the bores 17 of the stainless steel flange 16 and the bore 29 of the columbium fitting 26 terminate in outwardly flaring, frustro-conical sealing surfaces 62 and 64, respectively, which are adjacent the end surfaces of these parts. The upper sub-ring 48 includes an integral upwardly extending annular flange 65, the exterior frustro-conical surface 66 of which tapers upwardly and inwardly so as to engage and seal with the flared surface 62 on the flange 16. Similarly, the lower sub-ring 50 includes a downwardly extending flange 67, the exterior surface 68 of which tapers downwardly and inwardly. In this case, however, the surface 68 does not engage the flared surface 64 of the fitting 26 but clamps the end 60 of the thin stainless steel sleeve 56 to the surface 64.

As fully described in the above-mentioned Patent 2,766,829, the flared sealing surfaces of the conduit ends should be tapered more toward the horizontal than the tapered sealing surfaces on the sealing ring in an untightened coupling so that the flanges 65 and 67 of the sealing ring assembly 46 is deflected slightly when the conduit ends are drawn together. It should be understood that the sealing ring assembly 46 is shown herein in generally its ultimate position, and that the vertical flanges 65 and 67 exhibiting the sealing surfaces 66 and 68 are shown as being bent inwardly toward the axis of the bores 17 and 29 from the normal positions which they occupy when the assembly 46 is not incorporated in a coupling. The energy stored in the deflected flanges aids in holding the surfaces 66 and 68 tightly in contact with the surfaces 62 and 64 respectively, and in addition any fluid pressure within the bores 17 and 29 is exerted outwardly against the inner faces of the vertical flange portions to make the sealing action more effective.

In employing the coupling 10 to effect a sealed joint between the tubes 12 and 14 the flange 16 is welded to the end of the tube 14 and the fitting 26 with its slip-on flange 32 in place is welded to the tube 12. The two halves of the coupling are then placed adjacent each other with the bores 17 and 29 in general alignment and the ring assembly 46 is inserted between the flange 16 and the outer flanged end 30 of the fitting 26. The bolts 42 are inserted through the holes 40 and are drawn up tight by means of the nuts 44. As indicated above, the vertical flanges 65 and 67 of the sub-rings 48 and 50 are deflected inwardly by this action. At the same time the frustro-conical portion 60 of the sleeve 56 becomes tightly clamped between the surfaces 64 and 68.

Over-deflection of the flanges 65 and 67 is prevented by engagement of the sub-rings 48 and 50 with the flange 16 and the flange portion 30 of the fitting 26 and by engagement of the vertical rib 36 on the flange 16 with the vertical rib 38 on the flange 32, these pairs of members serving as stops for limiting axial movement of the two halves of the coupling toward each other. When large temperature changes occur within the coupling 10 the resultant changes in the dimensions of the dissimilar tubes 12 and 14 is localized at the juncture of the sub-rings 48 and 50, each of which will expand or contract laterally and/or vertically to the extent inherent in its material of construction. Leakage between the abutting surfaces of the sub-rings 48 and 50 as relative movement between the sub-rings occurs is prevented by the thin sleeve 56 which is sufficiently flexible to remain welded to the upper sub-ring 48 and clamped between the surfaces 64 and 68. The sleeve 56 thus acts somewhat like a bellows connected between the sub-rings 48 and 50.

While a specific coupling has been described it will be understood that the split ring assembly embodying the principles of the invention is not limited to use with the particular clamping and flange arrangement illustrated herein. For example, the clamping arrangements disclosed in Patent Numbers 2,766,998 and 2,766,999 may be employed, and in some cases the split ring assembly of the present invention may be modified to incorporate the features of the sealing rings disclosed in these patents. It is not intended, therefore, that the details of the clamping arrangement and split ring assembly illustrated herein be limiting except as they appear in the appended claims.

What is claimed is:

1. A sealing ring assembly for use in forming a seal between two conduit parts having end surfaces presented toward one another and flared sealing surfaces adjacent the end surfaces, each of said conduit parts having different thermal expansion characteristics, said sealing ring assembly comprising: first and second sealing ring members each having an inner annular flange portion defining a central bore and an integral external body portion, the body portions of said ring members being in abutting engagement and the flange portions being deflectable radially inwardly and extending in opposite directions and being tapered away from their body portions so as to be engageable with the flared sealing surfaces on the conduit parts, at least one of said flange portions sealingly engaging one of said flared sealing surfaces said ring members being constructed of materials having different thermal expansion characteristics; and a thin flexible sleeve disposed within and engaging the walls of the bores of said ring members, said sleeve being constructed of a material having the same thermal expansion characteristics as one of said ring members, a circumferential portion of said sleeve being integrally secured to said one ring member in leak-proof relationship, said sleeve extending through the bore of said other ring member and then in a generally opposite direction so as to overlie a portion of the tapered surface of the flange portion of said other ring member so as to become sealingly clamped between said last-named flange and a flared sealing surface of one of the conduit parts when said ring assembly is placed in its operative position.

2. A coupling comprising first and second conduit parts or the like having end surfaces presented toward one another and constructed of materials having different thermal expansion characteristics; securing means for drawing said end surfaces toward one another, each of said parts having inner walls which terminate in outwardly flaring sealing surfaces adjacent said end surfaces of said parts; a sealing ring assembly for sealing the ends of said parts when they are drawn toward one another, said sealing ring assembly including first and second ring members disposed between the ends of said parts, each of said ring members engaging one of said parts and constructed of a material having thermal expansion characteristics substantially the same as the part which it engages, each of said ring members comprising an external body portion one face of which engages a face of the other ring member and further comprising an inner annular flange portion which defines the bore of the respective ring member and which is deflected radially inwardly by said flared sealing surfaces, said flange portions extending in opposite directions and having exterior surfaces which taper away from said body portions; a thin flexible sleeve disposed within the bores of said ring members, said sleeve being secured to one of said ring members in leak-proof relationship and formed of a material having substantially the same thermal expansion characteristics as said one ring member, said flange of said one ring member sealingly engaging the adjacent flared sealing surface, said sleeve extending through the bore of the other ring member and then outwardly between the exterior tapered surface of the flange on said other ring member and the flared sealing surface of the respective part whereby the stored energy in said last-named flange tightly clamps said sleeve and prevents leakage between said sleeve and the respective flared sealing surface.

3. A sealing ring assembly for use in forming a seal between the ends of two conduit parts which have different thermal expansion characteristics which are drawn toward each other with the sealing ring clamped therebetween, said sealing ring comprising: first and second coaxial ring members, said second ring member being constructed of a material having different thermal expansion characteristics from the material of which said first ring member is constructed, each ring member having an annular, radially deflectable flange portion and an integral body portion, said flange portions extending in opposite axial directions, each flange portion having an exterior surface which tapers away from the body portion whereby said flange portions may be deflected radially inwardly by flared surfaces on the conduit parts to be joined, at least one of said flange portions sealingly engaging one of said flared surfaces the body portions of said ring members being in abutting engagement along surfaces which permit independent radial movement of said ring members during expansion and contraction thereof, and means for preventing leakage between the mutually abutting surfaces of said ring members when the latter are clamped together between conduit parts, said means comprising a flexible sleeve having an annular end portion sealingly engaging each of said ring members so as to bridge the junction between said ring members, one of said annular end portions overlying the tapered surface of one of said deflectable flange portions so as to be sealingly clamped thereto where said ring members are clamped between the conduit parts.

4. A sealing ring assembly as in claim 3 wherein said flexible sleeve is constructed of a material having the same thermal expansion characteristics as the material of one of said ring members and wherein the annular end portion of said sleeve corresponding to said one ring member is integrally connected to said one ring member.

References Cited by the Examiner

UNITED STATES PATENTS

| | | | |
|---|---|---|---|
| 1,665,208 | 4/1928 | Huff | 285—363 X |
| 2,006,365 | 7/1935 | Morton | 277—154 |
| 2,739,828 | 3/1956 | Schindler et al. | 285—187 X |
| 2,766,829 | 10/1956 | Watts et al. | 285—367 X |
| 2,938,562 | 5/1960 | Watts et al. | |
| 3,207,644 | 9/1965 | Hobson | 285—55 |

OTHER REFERENCES

Prince, Wm. A.: Bimetallic Seal Solves Cryogenic Problems, in Hydraulics & Pneumatics, pp. 105–109.

CARL W. TOMLIN, *Primary Examiner.*

D. W. AROLA, *Assistant Examiner.*